United States Patent [19]

Mase

[11] Patent Number: 5,459,848
[45] Date of Patent: Oct. 17, 1995

[54] LIBRARY APPARATUS WITH ACCESS FREQUENCY BASED ADDRESSING

[75] Inventor: Tomonori Mase, Kawasaki, Japan

[73] Assignee: Fujitsu Limited, Kawasaki, Japan

[21] Appl. No.: 941,444

[22] PCT Filed: Feb. 28, 1992

[86] PCT No.: PCT/JP92/00221

§ 371 Date: Oct. 22, 1992

§ 102(e) Date: Oct. 22, 1992

[87] PCT Pub. No.: WO92/15935

PCT Pub. Date: Sep. 17, 1992

[30] Foreign Application Priority Data

Mar. 7, 1991 [JP] Japan ......................... 3-41505

[51] Int. Cl.[6] .......................... G06F 12/00; G06F 12/10
[52] U.S. Cl. ................... 395/412; 395/417; 395/438; 395/478; 364/DIG. 2; 364/967.4; 364/967.5; 364/968; 360/69; 369/34; 369/186
[58] Field of Search ..................... 395/425, 400; 364/200 MS File, 900 MS File, 967.4, 967.5, 968; 360/69, 71; 369/30, 33, 34, 186

[56] References Cited

U.S. PATENT DOCUMENTS 5,233,591 8/1993 Nishihara ........................ 369/54

FOREIGN PATENT DOCUMENTS 2273368 11/1990 Japan.
2273370 11/1990 Japan.
378819 3/1991 Japan.

*Primary Examiner*—David L. Robertson
*Assistant Examiner*—Frank J. Asta
*Attorney, Agent, or Firm*—Greer, Burns & Crain, Ltd.

[57] ABSTRACT

A library apparatus in which an access part moves a medium to a drive from one of a plurality of cells having a cell address which is specified by a host computer and the drive records/reproduces information with respect to the medium. The apparatus is provided with a cell address conversion table for storing real addresses in correspondence with each of the cell addresses. The cell address specified by the host computer is regarded as a virtual address. Conversion is made by referring to the cell address conversion table to convert the virtual address into a real address which indicates the actual position of the cell within the library apparatus. Frequently accessed mediums are given cell addresses close to the drive.

12 Claims, 18 Drawing Sheets

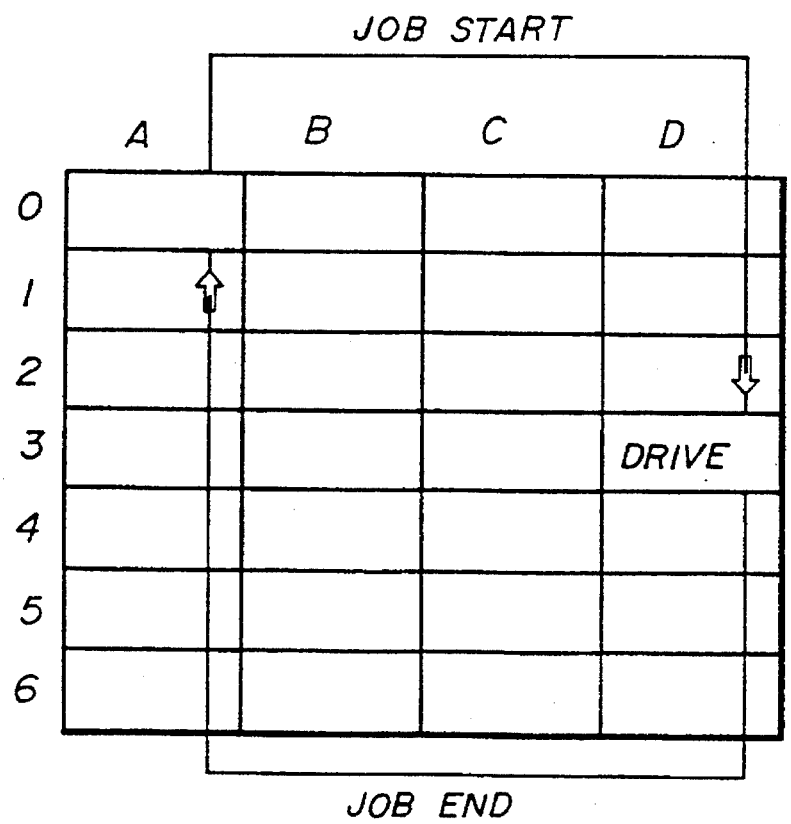
FIG.IA
FIG.IB

FIG.9A

STATE OF CELL (a)

FIG.9B

CELL ADDRESS CONVERSION TABLE

|   | A  | B | C  | D  |
|---|----|---|----|----|
| 0 | 0A |   |    |    |
| 1 |    |   |    |    |
| 2 |    |   | 2C |    |
| 3 |    |   |    | 3D |
| 4 |    |   |    |    |
| 5 |    |   |    |    |
| 6 |    |   |    |    |

ACCESS FREQUENCY TABLE

|   | A  | B | C | D |
|---|----|---|---|---|
| 0 | 19 |   |   |   |
| 1 |    |   |   |   |
| 2 |    |   | 0 |   |
| 3 |    |   |   | 0 |
| 4 |    |   |   |   |
| 5 |    |   |   |   |
| 6 |    |   |   |   |

STATE OF CELL

CELL ADDRESS
CONVERSION
TABLE (a)

(b)

ACCESS FREQUENCY
TABLE

STATE OF CELL

(a)

|   | A | B | C | D |
|---|---|---|---|---|
| 0 |   |   |   |   |
| 1 |   |   |   |   |
| 2 |   |   |   |   |
| 3 |   |   |   | DRIVE |
| 4 |   |   |   |   |
| 5 |   |   |   |   |
| 6 |   |   |   |   |

CELL ADDRESS CONVERSION TABLE

|   | A | B | C | D |
|---|---|---|---|---|
| 0 | 2C |   |   |   |
| 1 |   |   |   |   |
| 2 |   |   | 0A |   |
| 3 |   |   |   | 3D |
| 4 |   |   |   |   |
| 5 |   |   |   |   |
| 6 |   |   |   |   |

ACCESS FREQUENCY TABLE

|   | A | B | C | D |
|---|---|---|---|---|
| 0 | 0 |   |   |   |
| 1 |   |   |   |   |
| 2 |   |   | 20 |   |
| 3 |   |   |   | 0 |
| 4 |   |   |   |   |
| 5 |   |   |   |   |
| 6 |   |   |   |   |

STATE OF CELL

CELL ADDRESS CONVERSION TABLE

ACCESS FREQUENCY TABLE

STATE OF CELL

FIG. 13B

CELL ADDRESS CONVERSION TABLE

|   | A | B | C | D |
|---|---|---|---|---|
| 0 | 2C |   |   |   |
| 1 |   |   |   |   |
| 2 |   |   | 0A |   |
| 3 |   |   |   | 3D |
| 4 |   |   |   |   |
| 5 |   |   |   |   |
| 6 |   |   |   |   |

(a)

(b)

ACCESS FREQUENCY TABLE

|   | A | B | C | D |
|---|---|---|---|---|
| 0 | 0 |   |   |   |
| 1 |   |   |   |   |
| 2 |   |   | 20 |   |
| 3 |   |   |   | 0 |
| 4 |   |   |   |   |
| 5 |   |   |   |   |
| 6 |   |   |   |   |

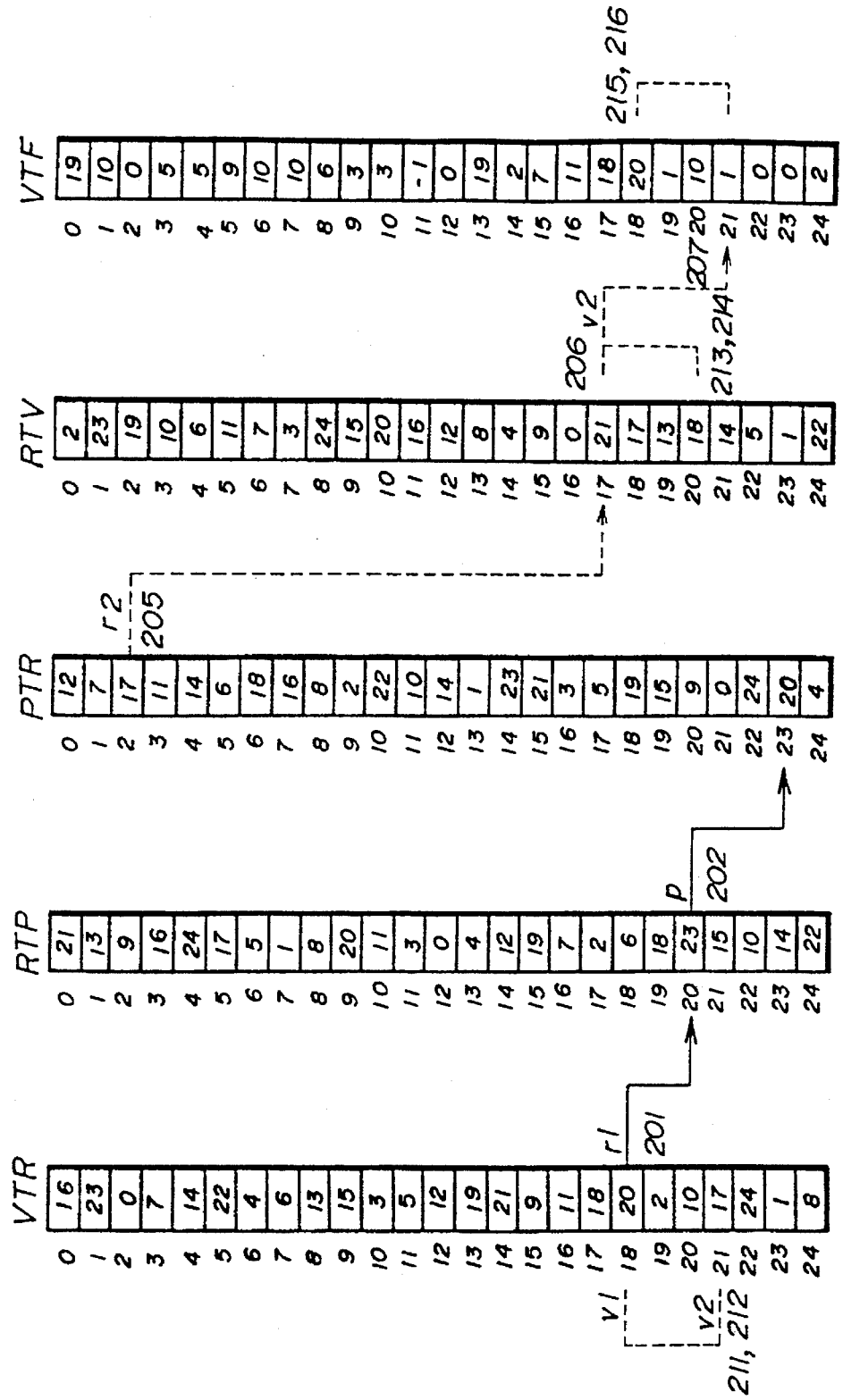

LIBRARY APPARATUS WITH ACCESS FREQUENCY BASED ADDRESSING

TECHNICAL FIELD

The present invention generally relates to library apparatuses, and more particularly to a library apparatus which moves a medium from a plurality of cells (storage locations) to a drive and records/reproduces information with respect to the medium.

BACKGROUND ART

A library apparatus is an apparatus which automatically carries out the operation of mounting a medium such as a cartridge type magnetic tape and optical disk, and is used as a mass storage for saving a large amount of files in the magnetic disk units or the like. Hence, the library apparatus is important when improving the reliability, maintainability and availability of the system. The library apparatus is made up of an access part for transporting the medium, a driver part for recording/reproducing information with respect to the medium, and a cell part for storing a plurality of mediums.

A description will be given of the operation of a conventional library apparatus in conjunction with FIG. 1. As shown in FIG. 1A, addresses 0A-3C and 4A-6D are assigned to the cells, and the drive is fixedly provided at the position of the address 3D. The access part (not shown) transports the medium which is stored in the cell having the address which is specified at the start of the job (JOB), and returns the medium back to the cell having the original address at the end of the job. FIG. 1B shows the case where the specified address is 0A.

FIG. 1C shows a move command (MOVE) which is issued with respect to the library apparatus from a central processing unit (CPU) of a host in the above described case. In this case, the move command indicates that the source address is 0A and the destination address is 3D. When the drive ends the information recording/reproduction with respect to the medium, the CPU of the host issues a move command MOVE 3D, 0A to return the medium back to the cell having the source address 0A.

Generally, the medium transport time can be considered as one factor determining the performance of the library apparatus, and this medium transport time indicates the moving time of the medium from the cell to the drive. Conventionally, the moving of the medium which is stored in the cell distant from the drive takes more time compared to the moving of the medium which is stored in the cell in the vicinity of the drive. Hence, if the job which uses the medium stored in the cell which is distant from the drive is frequently started, there was a problem in that the processing efficiency of the library apparatus may deteriorate.

DISCLOSURE OF THE INVENTION

Accordingly, it is a general object of the present invention to provide a novel and useful library apparatus in which the problem described above is eliminated.

Another and more specific object of the present invention is to provide a library apparatus in which an access part moves a medium to a drive from one of a plurality of cells having a cell address which is specified by a host computer and the drive records/reproduces information with respect to the medium, and which comprises a cell address conversion table for storing real addresses in correspondence with each of the cell addresses, and means for regarding the cell address specified by the host computer as a virtual address and referring to the cell address conversion table to convert the virtual address into a real address which indicates the actual position of the cell within the library apparatus.

Still another object of the present invention is to provide a library apparatus which can improve the processing efficiency with respect to the mediums which are frequently used, by renewing the address conversion table.

According to the library apparatus of the present invention, the cell address which is specified by the host computer and the cell address which is actually managed within the library apparatus are independent of each other. As a result, the processing efficiency of the library apparatus is improved because it becomes possible to store the medium at an optimum position within the library apparatus.

Other objects and further features of the present invention will be apparent from the following detailed description when read in conjunction with the accompanying drawings.

BRIEF DESCRIPTION OF THE DRAWINGS

FIGS. 1A through 1C are diagrams for explaining the operation of a conventional library apparatus;

FIGS. 9 through 13 are state diagrams for explaining the first embodiment;

FIGS. 14A through 14E are diagrams for explaining tables which are used in a second embodiment of the library apparatus according to the present invention;

FIG. 15 is a diagram for explaining a table access when rearranging magnetic tape cartridges by respectively replacing the tables shown in FIGS. 14A through 14E into one dimension;

BEST MODE OF CARRYING OUT THE INVENTION

First, a description will be given of the operating principle of a library apparatus according to the present invention, by referring to FIG. 2.

Figure 1C:
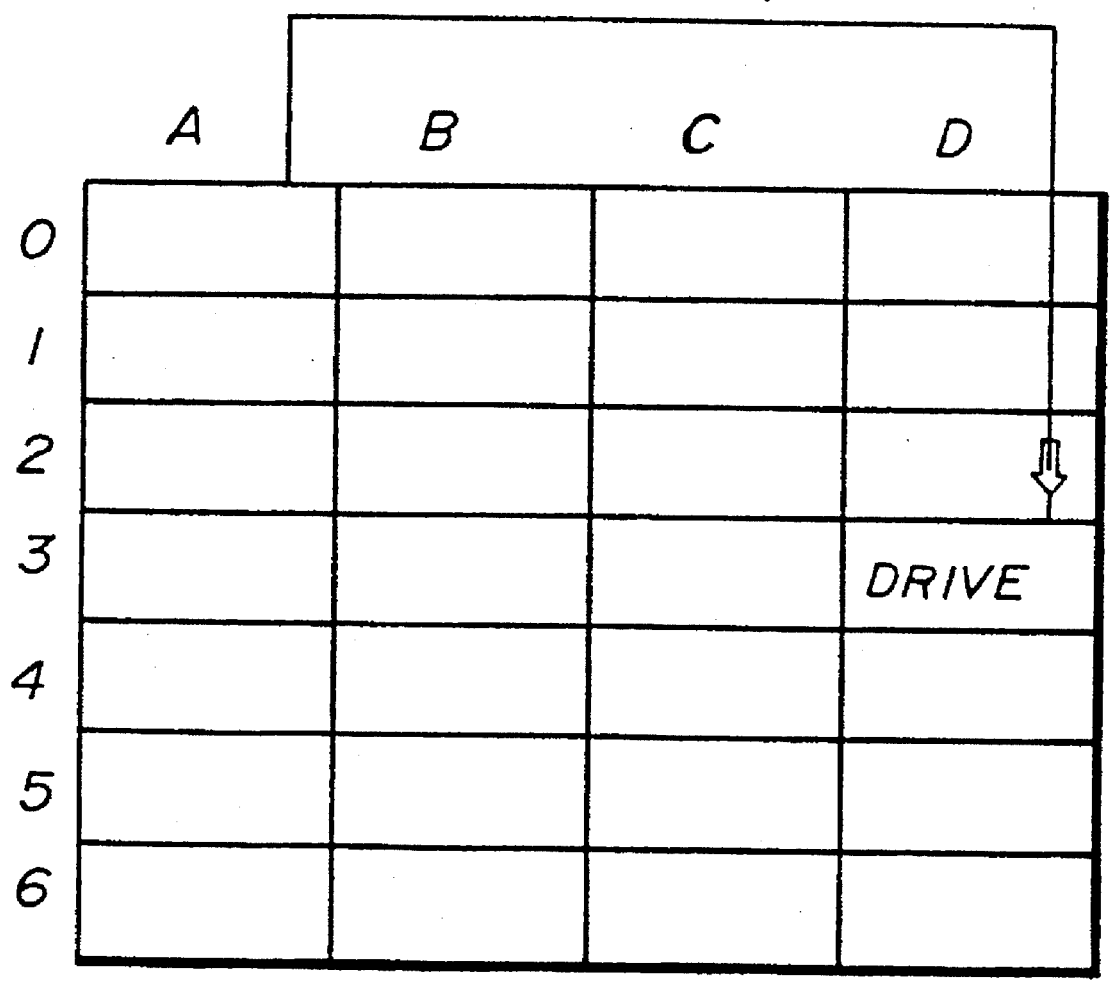
Figure 2:
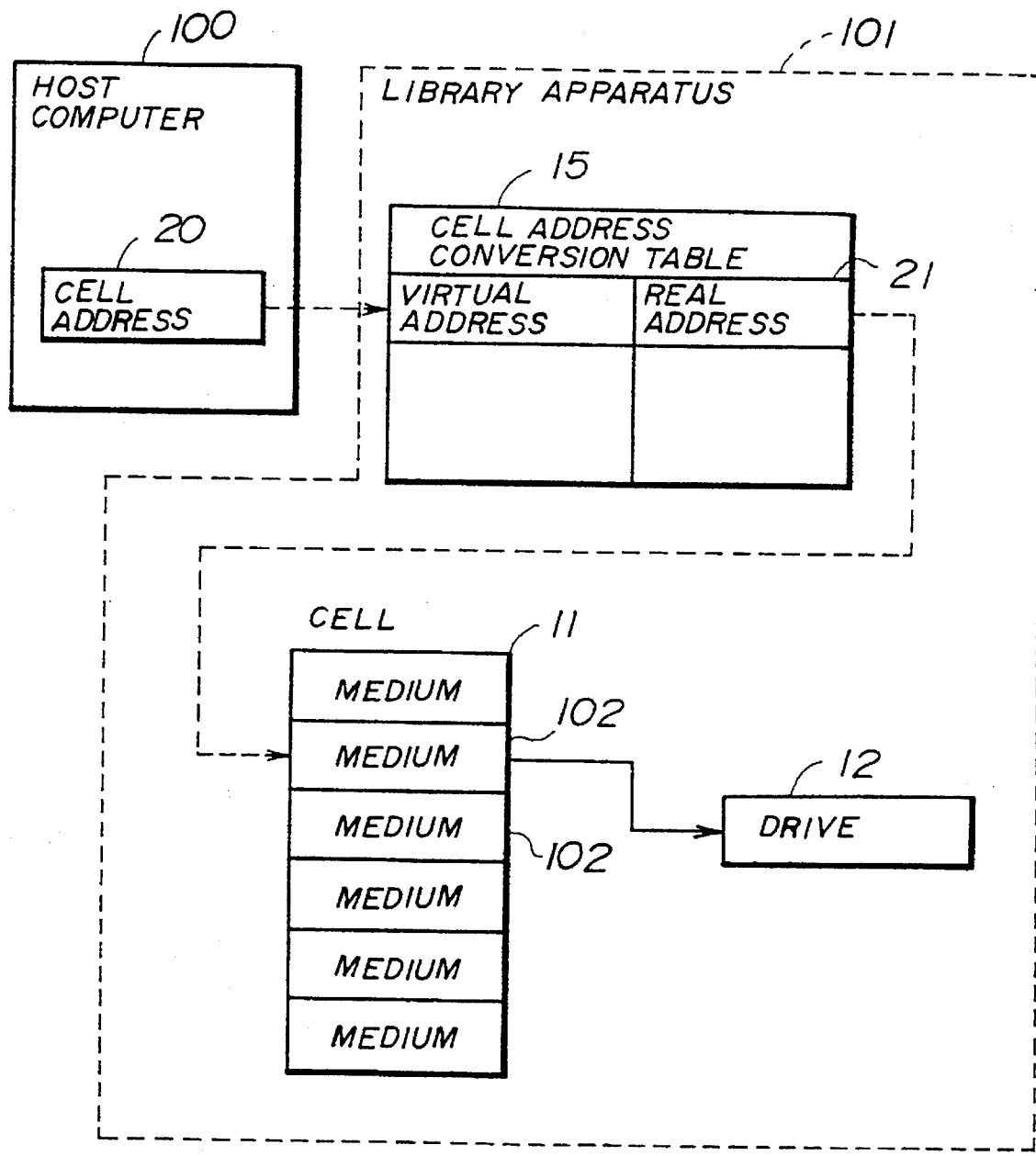
FIG. 2 is a system block diagram for explaining the operating principle of the present invention.

In FIG. 2, a library apparatus 101 has a cell address conversion table 15 for converting a cell address which is specified by a host computer 100 as a virtual address 20 into a real address 21 within the library apparatus 101. An access part (not shown) of the library apparatus 101 extracts a medium 102 from a cell 11 which is specified by the real address 21 and transports the medium 102 to a drive 12. The drive 12 records/reproduces information with respect to the medium 102, and when the recording/reproducing operation ends, the access part returns the medium 102 from the drive 12 back to the original cell 11.

The frequency with which an access is made to the medium 102 depends on each medium 102. Hence, data of the cell address conversion table 15 are updated so that those mediums 102 having a high access frequency are stored in the cells 11 which are located in the vicinity of the drive 12 in terms of the real address. As a result, it is possible to reduce the operating time of the medium 102 which has the high access frequency by storing this medium 102 in the cell 11 which is located in the vicinity of the driver 12.

Next, a description will be given of a first embodiment of the library apparatus according to the present invention. In this embodiment, a magnetic tape cartridge is used as the medium.

Figure 3:
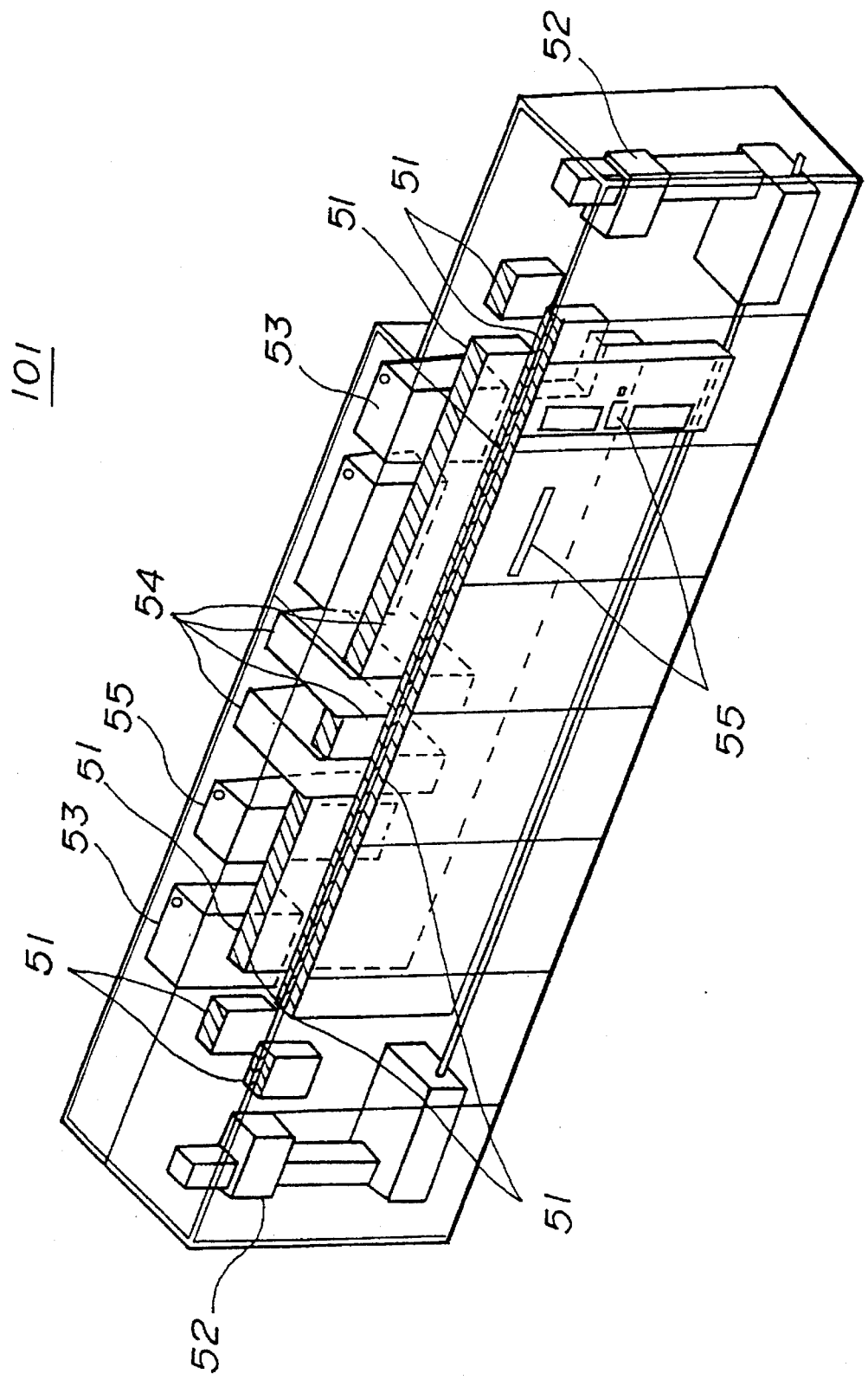
FIG. 3 is a perspective view showing the general construction of a first embodiment of a library apparatus according to the present invention.
Figure 4:
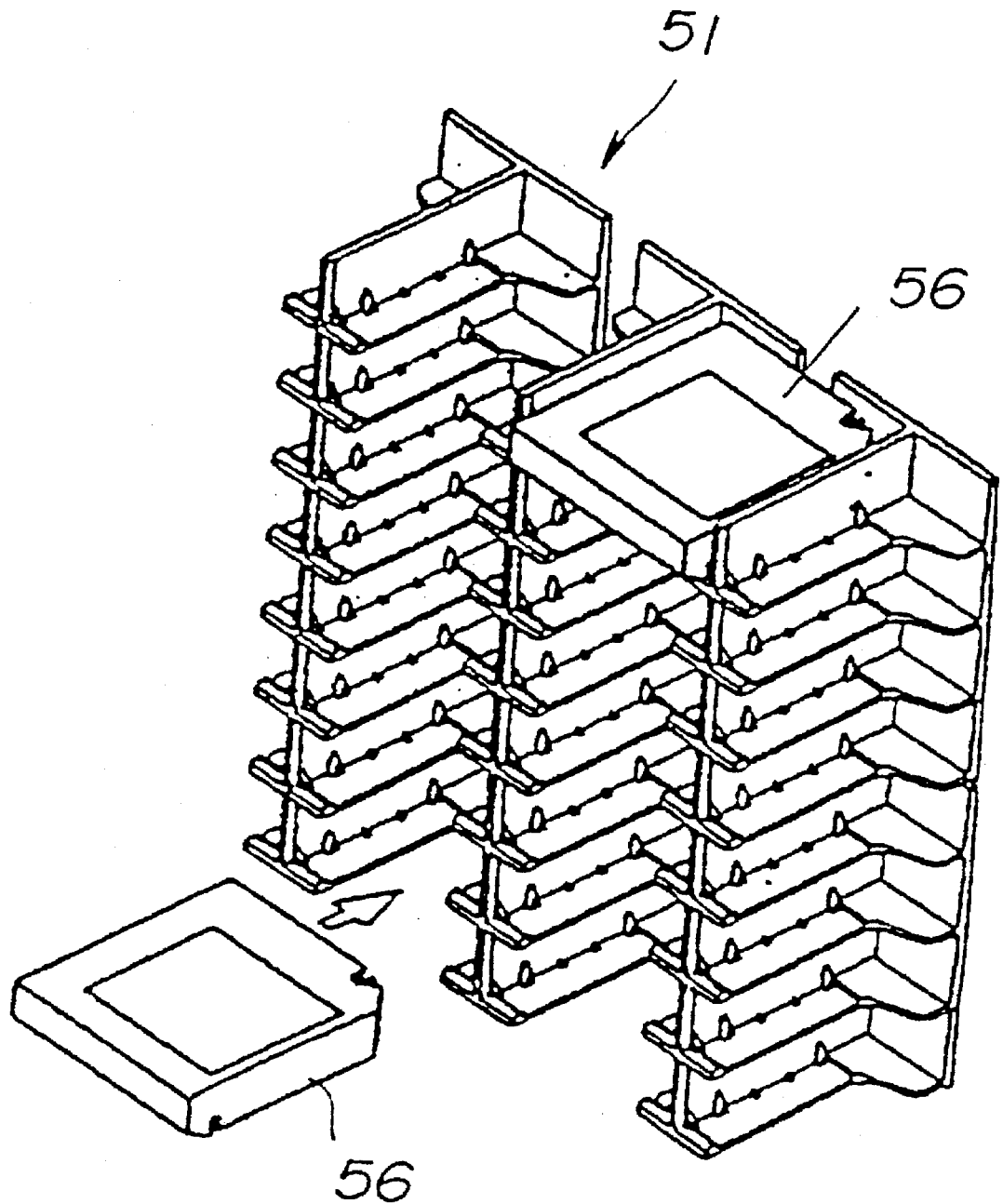
FIG. 4 is a perspective view showing a cell part shown in FIG. 3 on an enlarged scale.
Figure 5:
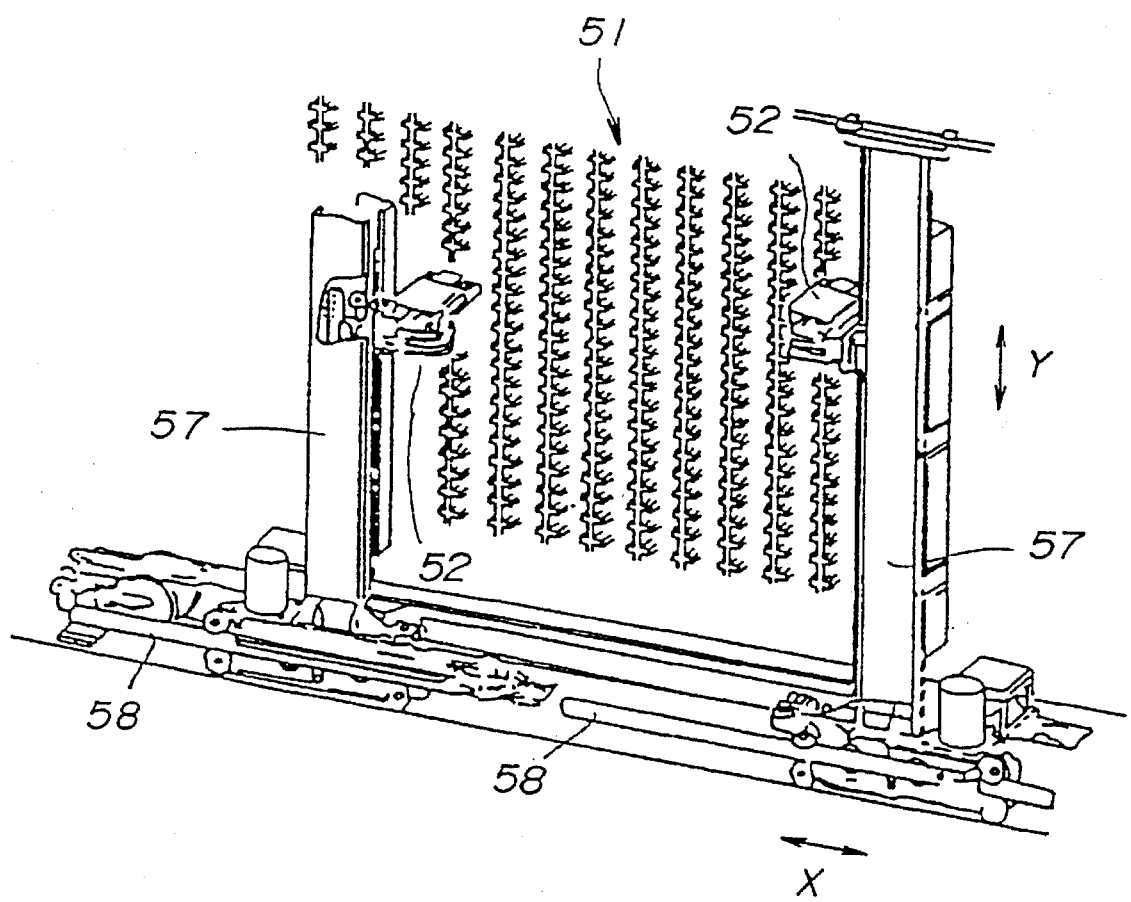
FIG. 5 is a perspective view showing an access part shown in FIG. 3.

FIG. 3 shows the general construction of this embodiment, and FIG. 4 shows the cell part shown in FIG. 3 on an enlarged scale. FIG. 5 shows the access part, and FIG. 6 shows the block system of an essential part of the library apparatus.

In FIG. 3, the library apparatus 101 generally includes a cell part 51 which is made up of a plurality of cells 11, an access part 52, an access controller 53, a magnetic tape unit (MTU) 54, a MTU controller 54, and an operation panel 55. The cell part 51 has the construction shown in FIG. 4, and stores a plurality of magnetic tape cartridges 56. The access part 52 is movable in a vertical direction Y along a guide 57 as shown in FIG. 5, and is also movable in a horizontal direction X along a guide 58. The access part 52 itself has a known construction for clamping the magnetic tape cartridge 56 to extract the magnetic tape cartridge 56 from the cell 11 of the cell part 51 and to return the magnetic tape cartridge 56 back to the cell 11 of the cell part 51, and for this reason, a description related to the driving system and the like of the access part 52 will be omitted.

Figure 6:
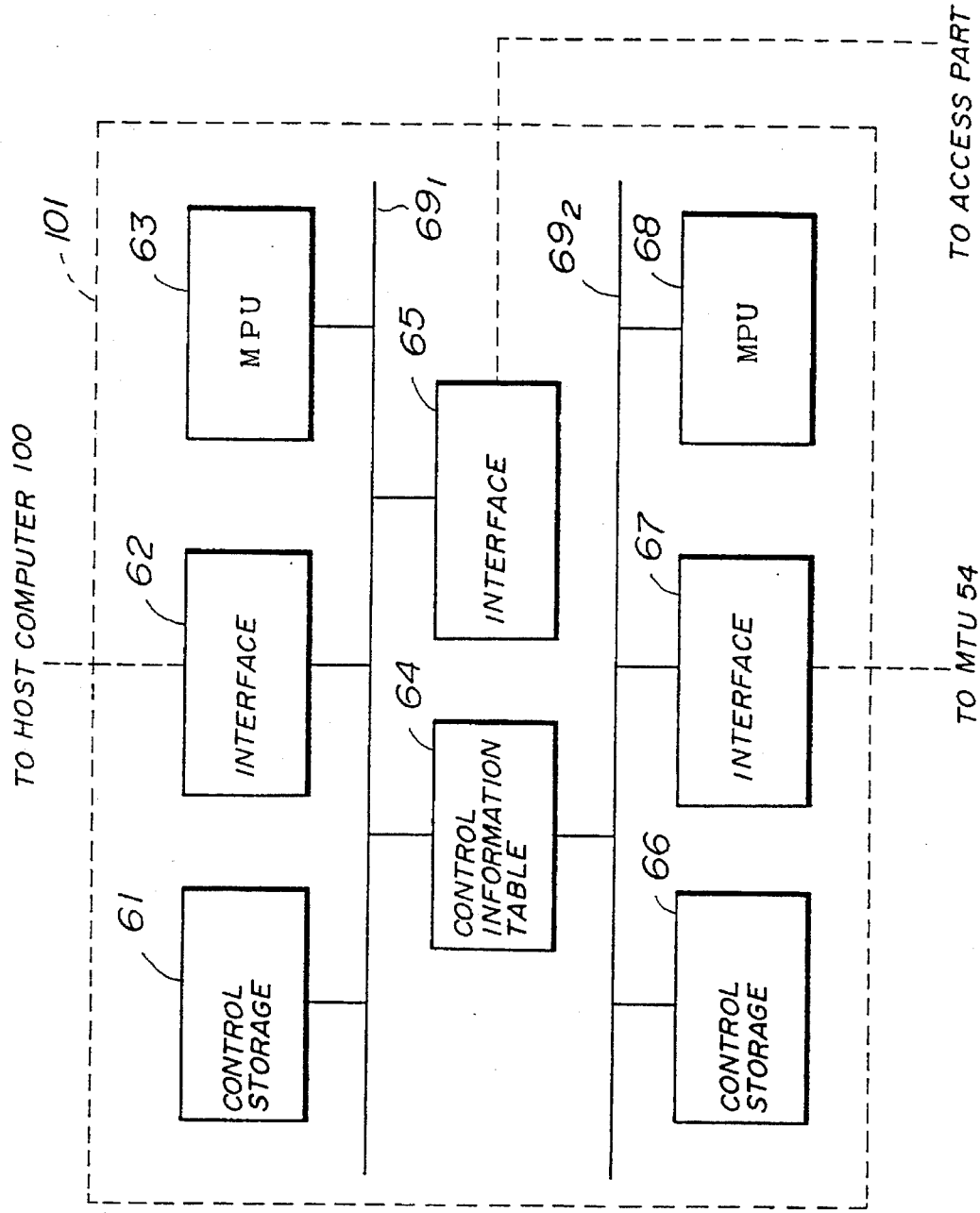
FIG. 6 is a system block diagram showing an essential part of the library apparatus.

FIG. 6 shows an essential part of the library apparatus 101. A control storage 61, an interface 62 and a microprocessor unit (MPU) 63 are mainly used for the control of the channels connected to the host computer 100 and for the control of the access part 52. On the other hand, a control storage 66, an interface 67 and a MPU 69 are mainly used for the control of the MTU 54. Various programs and tables are stored in the control storages 61 and 66. The interface 62 is coupled to the host computer 100 via the channels. The interface 67 is coupled to the MTU 54.

The control storage 61, the interface 62 and the MPU 63 are connected to a bus $69_1$, and a control information table 64 and an interface 65 are also connected to this bus $69_1$. On the other hand, the control storage 66, the interface 67 and the MPU 68 are connected to a bus $69_2$, and the control information table 64 is also connected to this bus $69_2$. The interface 65 is coupled to the access part 52.

Next, a description will be given of the operation of this embodiment, by referring to FIGS. 7 through 12.

Figure 7:
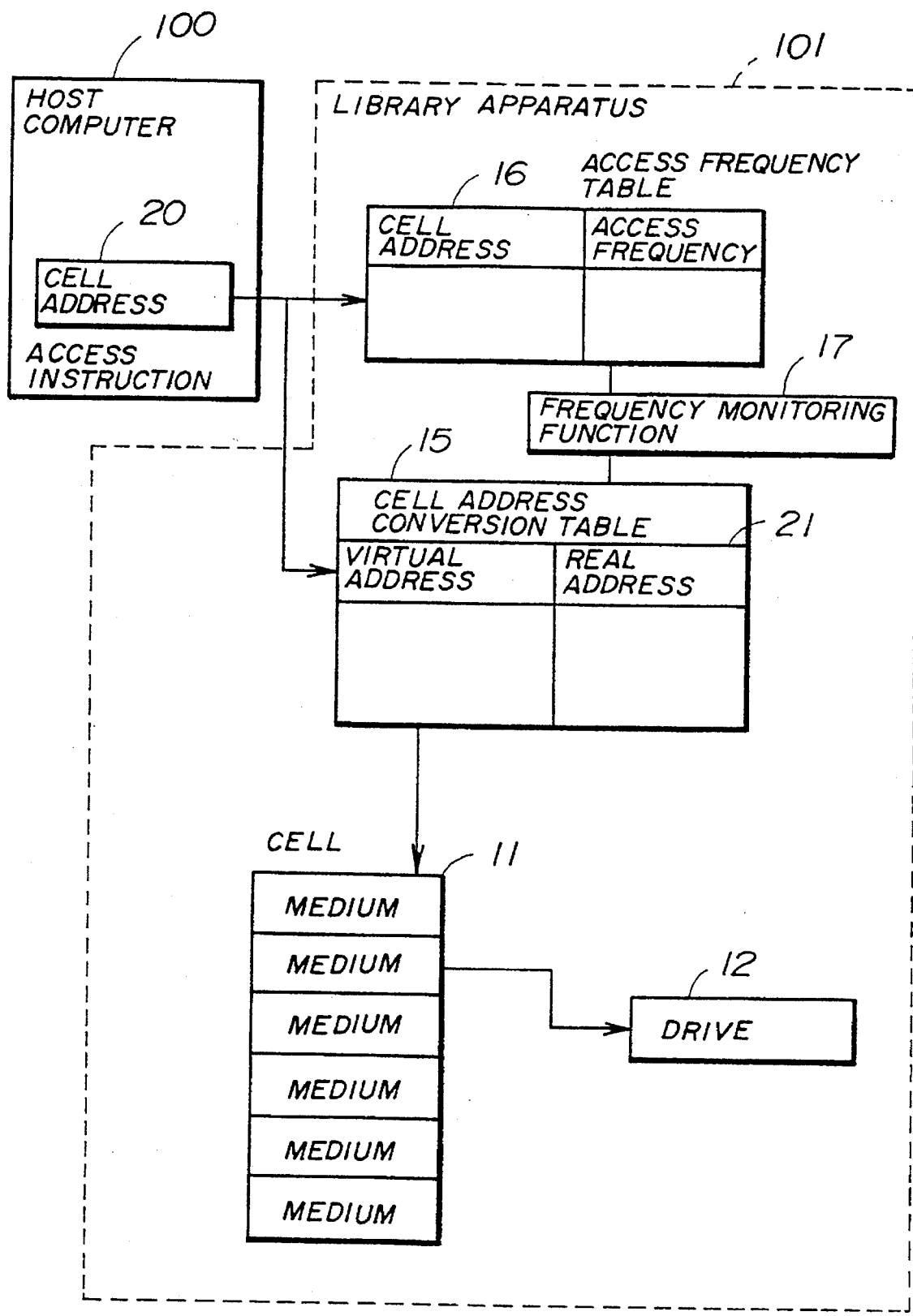
FIG. 7 is a system block diagram showing an essential part of the first embodiment.

FIG. 7 shows an essential part of this embodiment, and in FIG. 7, those parts which are the same as those corresponding parts in FIG. 2 are designated by the same reference numerals, and a description thereof will be omitted. The cell address conversion table 15 and an access frequency table 16 are stored in the control storage 61 shown in FIG. 6, for example, and a frequency monitoring function 17 corresponds to a program stored in the control storage 61. In addition, the driver 12 corresponds to the MTU 54 shown in FIG. 3. The access frequency table 16 records the frequency of the access for each virtual address. The frequency monitoring function 17 changes the correspondence to a real address close to the driver 12 if the access frequency to the cell address recorded in the access frequency table 16 becomes greater than or equal to a predetermined value. Thus, the address conversion table 15 stores a dynamic physical/logical address correspondence relationship.

Figure 8:
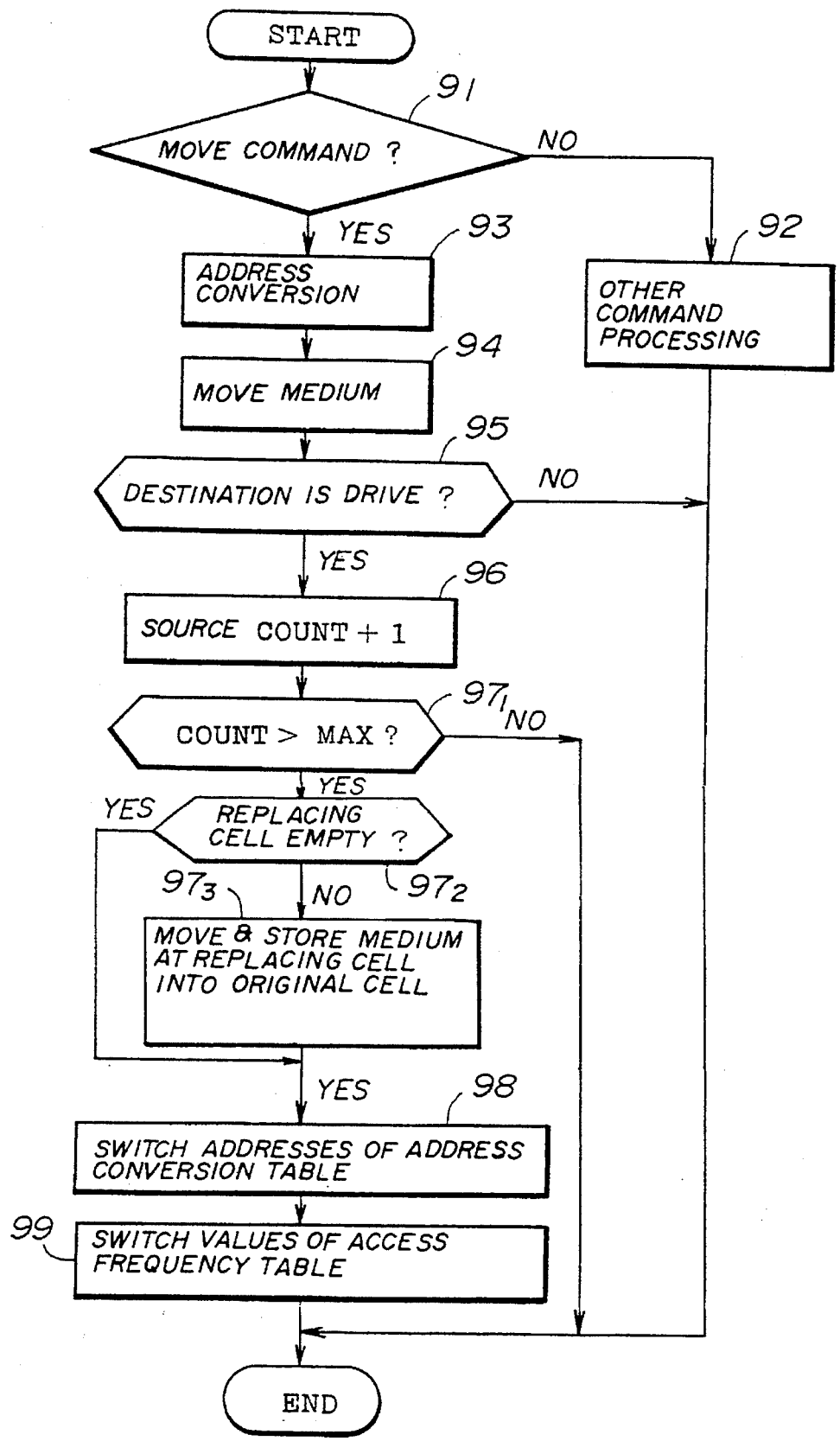
FIG. 8 is a flow chart for explaining the operation of the first embodiment.

FIG. 8 is a flow chart for explaining the operation of this embodiment, and corresponds to the operation of the MPU 63 which executes the programs stored in the control storage 61 shown in FIG. 6.

In FIG. 8, when a step 91 receives an command from the host computer 100, a decision is made to determine whether or not the command is a move command. If the decision result in the step 91 is NO, a step 92 processes other commands and the process ends. On the other hand, if the decision result in the step 91 is YES, a step 93 converts the virtual address 20 from the host computer 100 into the real address 21.

FIG. 9 shows in (a) the operation of the access part 52, in (b) the cell address conversion table 15, and in (c) the access frequency table 16, for the case where the move command is (MOVE 0A, 3D). In a step 93, the MPU 63 converts the virtual address 0A of the cell 11 into the real address 0A by using the address conversion table 15, and similarly converts the virtual address 3D of the driver 12 into the real address 3D. Next, a step 94 transports the magnetic tape cartridge 56 from the source address 0A to the destination address 3D. At this point in time, the virtual address and the real address match even after the address conversion.

A step 95 decides whether or not the destination address is the address of the drive 12. The process ends if the decision result in the step 95 is NO. However, if the decision result in the step 95 is YES, a step 96 increments by one the value of the cell address in the access frequency table 16 corresponding to the destination address. FIG. 10 shows the state at this point in time. In this case, as may be seen from FIG. 10 (c), "19" which was recorded at the position 0A in the access frequency table 16 is updated to "20".

Next, a step $97_1$ decides whether or not the updated frequency value of the access frequency table 16 has exceeded a predetermined value "20". The process ends if the decision result in the step $97_1$ is NO. However, if the decision result in the step $97_1$ is YES, a step $97_2$ decides whether or not a replacing cell 11 is empty. If the decision result in the step $97_2$ is NO, a step $97_3$ moves the magnetic tape cartridge 56 at the replacing cell 11 to the original cell 11 and stores it therein. If the decision result in the step $97_2$ is YES or after the step $97_3$, a step 98 switches 0A of the cell address conversion table 15 and the real address 2C corresponding to the cell 11 close to the drive 12. In addition, a step 99 switches the values corresponding to 0A and 2C of the access frequency table 16. When selecting the replacing real address 2C, the step 98 searches for an address which is close to the drive 12 and has a small access frequency according to a predetermined rule.

FIG. 11 shows a state where 0A and 2C of the cell address conversion table 15 are switched, and "20" recorded at the position 0A of the access frequency table 16 is switched with "0" recorded at the position 2C. After the end of this job, the magnetic tape cartridge 56 is stored in the cell 11 which has the cell address 2C and is close to the drive 12 in terms of the real address, but is stored in the cell 11 which has the source address 0A at the time when the job was started in terms of the virtual address. FIG. 12 shows this state.

Next, when an access is made to the virtual address 0A, it can be found by referring to the cell address conversion table 15 that the corresponding magnetic tape cartridge 56 is located at the real address 2C. Hence, if the move command is (MOVE 0A, 3D), the move command is converted into (MOVE 2C, 3D) by the address conversion. FIG. 13 shows this state. In this case, because the magnetic tape cartridge 56 moves from the cell address 2C to the address 3D of the drive 12, it is possible to make a high-speed access compared to the case where the magnetic tape cartridge 56 is moved from the cell address 0A.

According to this embodiment, it is possible to make the address which is specified by the host computer independent from the cell address which is actually managed within the library apparatus. For this reason, it is possible to store the medium in the cell which is located at an optimum position within the library apparatus, and the processing efficiency of the library apparatus can be improved. In addition, even if a specific cell or drive cannot be used due to a failure or the like, it is possible to cope with the failure and prevent interruption of the work by changing the correspondence of the virtual address and the real address.

Next, a description will be given of a second embodiment of the library apparatus according to the present invention, by referring to FIGS. 14 through 16. The construction and the block system of this embodiment are the same as the construction shown in FIGS. 3 through 5 and the block system shown in FIG. 6, and illustration and description thereof will be omitted. This embodiment differs from the first embodiment in that this embodiment uses 5 kinds of tables.

Figures 14A, 14B, 14C, 14D, 14E:
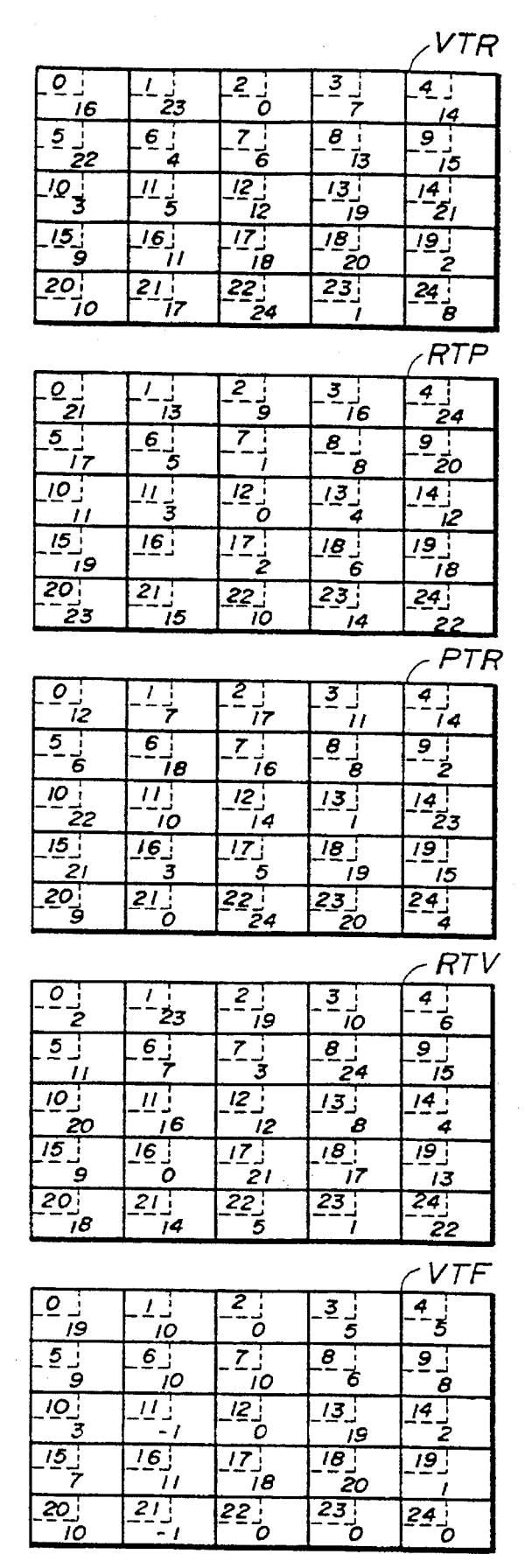

FIG. 14A shows a table VTR for converting the virtual address into the real address, and in FIG. 14A, each real address is indicated at the center of the slot and each virtual address is indicated at the top left of the slot. FIG. 14B shows a table RTP for converting the real address into a priority order, and in FIG. 14B, each priority order is indicated at the center of the slot and each real address is indicated at the top left of the slot. FIG. 14C shows a table PTR for converting the priority order to the real address, and in FIG. 14C, each real address is indicated at the center of the slot and each priority order is indicated at the top left of the slot. FIG. 14D shows a table RTV for converting the real address into the virtual address, and in FIG. 14D, each virtual address is indicated at the center of the slot and each real address is indicated at the top left of the slot. In addition, FIG. 14E shows a table VTF for converting the virtual address into the frequency, and in FIG. 14E, each frequency is indicated at the center of the slot and each virtual address is indicated at the top left of the slot.

FIG. 15 shows the table access for the case where the magnetic tape cartridge 56 is rearranged, by respectively replacing the tables shown in FIGS. 14A through 14E into one dimension. FIG. 16 is a flow chart for explaining the operation of this embodiment, and corresponds to the part of the steps 98 and 99 shown in FIG. 8. It will be assumed that the real address of the drive 12 is "12" and the frequency has a negative value if no magnetic tape cartridge 56 is stored in the cell 11. Furthermore, in FIGS. 15 and 16, v1 and r1 respectively denote the virtual address and the real address of the cell 11 which is to be replaced and is the source of the rearrangement, and v2 and r2 respectively denote the virtual address and the real address of the replacing cell 11.

Figure 16:
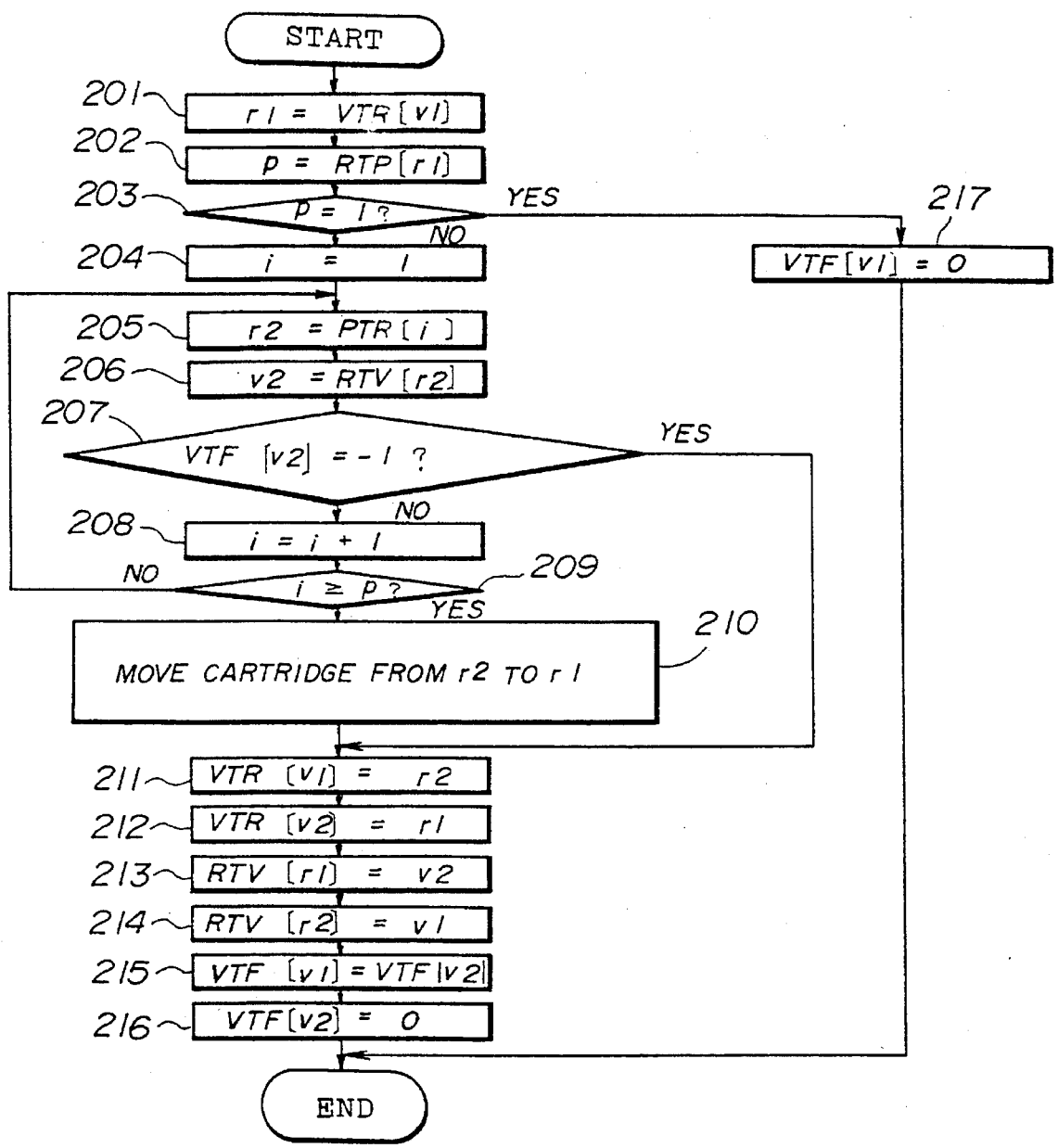
FIG. 16 is a flow chart for explaining the operation of the second embodiment.

In FIG. 16, a step 201 converts the source virtual address into the real address by use of the table VTR. Next, a step 202 uses the table RTP to obtain the priority P of the source real address. A step 203 decides whether or not the priority P is "1". If the decision result in the step 203 is YES, no rearranging operation is made, and the process ends after a step 217 clears the slot corresponding to v1 of the table VTF. On the other hand, if the decision result in the step 203 is NO, steps 204 through 209 are carried out to search for the cell 11 (frequency=−1) having a high priority P.

The step 204 initializes the index i to "1". The step 205 obtains the real address using the table PTR. The step 206 obtains the virtual address corresponding to the real address obtained in the step 205 by use of the table RTV. The step 207 refers to the table VTF to decide whether or not the frequency of the virtual address obtained in the step 205 is "−1" (empty cell). If the decision result in the step 207 is YES, the search operation is ended and the process advances to a step 211. On the other hand, if the decision result in the step 207 is NO, the step 208 updates the index i. Then, the step 209 decides whether or not the value of the index i is greater than or equal to the priority P of the source. If the decision result in the step 209 is NO, the search operation is continued by returning to the step 205.

If the decision result in the step 209 is YES and there is no empty cell, a step 210 moves the magnetic tape cartridge 56 which is stored in the cell 11 having a priority which is "1" greater than the priority P of the source cell to the cell 11 at the source real address. The step 211 replaces the slot which corresponds to the source virtual address of the source in the table VTR by the replacing real address of the replacing cell. A step 212 replaces the slot which corresponds to the replacing virtual address of the Table VTR by the source real address. A step 213 replaces the slot which corresponds to the source real address of the table RTV by the replacing virtual address. A step 214 replaces the slot which corresponds to the replacing real address of the table RTV by the source virtual address. A step 215 replaces the source frequency of the source cell in the table VTF by the replacing frequency of the replacing cell. In addition, a step 216 clears the replacing frequency of the replacing cell in the table VTR to "0", and the process ends.

The tables VTR, RTP, PTR, RTV and VTF are stored in the storage region 61 shown in FIG. 6, and the operation of FIG. 16 is controlled by the MPU 63. However, the tables PTR and RTV are not essential and may be omitted.

Figure 17:
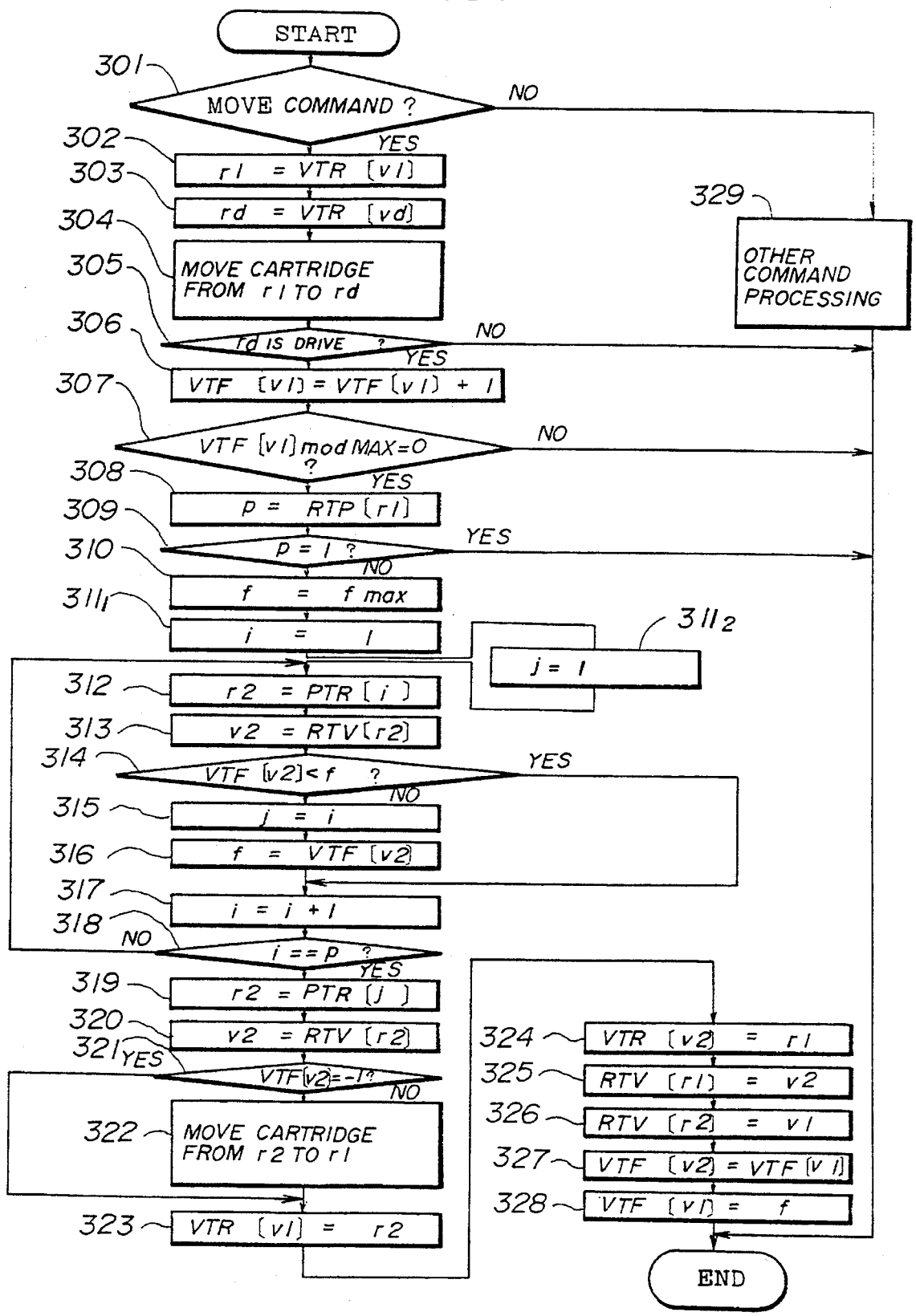
FIG. 17 is a flow chart for explaining the operation of a third embodiment of the library apparatus according to the present invention.

Next, a description will be given of a third embodiment of the library apparatus according to the present invention, by referring to FIG. 17. FIG. 17 is a flow chart for explaining the operation of this embodiment, and corresponds to the control of the MPU 63 shown in FIG. 6. In this embodiment, when the host computer 100 specifies as the parameters of the move command the virtual address v1 of the source cell and the virtual address vd of the destination cell, the real address v1 of r1 is converted into the real address r2 according to a minimum frequency search algorithm.

In FIG. 17, a step 301 decides whether or not the command from the host computer 100 is the move command. If the decision result in the step 301 is NO, the process ends after processing other command in a step 329. On the other hand, if the decision result in the step 301 is YES, a step 302 converts the virtual address v1 of the source cell into the real address r1. In addition a step 303 converts virtual address vd of the destination cell to the real address rd. The address conversions in the steps 302 and 303 may be made using the table VTR of the second embodiment, for example. A step 304 moves the magnetic tape cartridge 56 from the cell 11 having the real address r1 to the cell having the real address rd. Then, a step 305 decides whether or not the real address rd of the destination cell is the address of the drive 12, and the process ends if the decision result in the step 305 is NO.

On the other hand, if the decision result in the step 305 is YES, a step 306 increases the frequency which corresponds to the virtual address v1 of the source cell by "1" in the table VTF, for example. A step 307 decides whether or not the frequency value of the table VTF is an integer multiple of MAX, and the process ends if the decision result in the step 307 is NO. If the decision result in the step 307 is YES, a step 308 obtains from the table RTP the priority corresponding to the real address r1 of the source cell, and regards this priority as P. Next, a step 309 decides whether or not the priority P of the source cell is the highest priority "1", and the process ends without making an address conversion if the decision result in the step 309 is YES.

However, if the decision result in the step 309 is NO, a step 310 initializes a variable f which is used for the frequency comparison to a maximum value $f_{max}$ the frequency can assume in the table VTF, and stores this initialized variable f. A step 311 initializes the index i for searching the table to the priority "1". A step $311_2$ initializes the priority j to "1" because the value of the priority j may be undetermined in a step 319 which will be described later. A step 312 uses the table PTR to make r2 the real address corresponding to the priority i, and a step 313 uses the table RTV to make v2 the virtual address corresponding to the real address r2. A step 314 uses the table VTF to decide whether or not the frequency corresponding to the virtual address v2 is smaller than the variable f, and the process advances to a step 317 which will be described later if the decision result in the step 314 is YES.

If the decision result in the step 314 is NO, a step 315 stores the priority i in the variable j. In addition, a step 316 stores the frequency corresponding to the virtual address v2 in the table VTF in the variable f. The step 317 updates the index i by incrementing it by "1", and a step 318 decides whether or not the index i is the priority P of the source cell. The process returns to the step 312 if the decision result in the step 318 is NO.

On the other hand, if the decision result in the step 318 is YES, a step 319 uses the table PTR to make the real address corresponding to the variable j to r2, and this r2 becomes the real address of the replacing cell. In addition, a step 320 uses the table RTV to make v2 the virtual address corresponding to the real address r2, and this v2 becomes the virtual address of the replacing cell. A step 321 uses the table VTF to decide whether or not the frequency corresponding to the real address v2 of the replacing cell is "−1" (empty cell), and the process advances to a step 323 which will be described later if the decision result in the step 321 is YES. If the decision result in the step 321 is NO, another magnetic tape cartridge 56 is stored in the replacing cell 11, and a step 322 moves this magnetic tape cartridge 56 to the cell 11 having the real address r1 of the replacing cell.

Steps 323 through 326 are substantially the same as the steps 211 through 214 shown in FIG. 16, and a description thereof will be omitted. Next, a step 327 uses the table VTF to make the frequency of the virtual address v1 of the source cell the frequency corresponding to the virtual address v2 of the replacing cell. In addition, a step 328 uses the table VTF to make the frequency f of the replacing cell the frequency corresponding to the virtual address v1 of the source cell.

In each of the above described embodiments, the address of the drive may be provided independently of the cell address. In other words, the drive may be provided at a location independent of the cell part.

In addition, the drive does not necessarily have to be provided at a fixed position, and may be provided integrally on the access part so that the drive is movable. In this case, a home position to which the drive is returned after the end of each recording/reproducing operation corresponds to the fixed position of the above described embodiments.

Further, the present invention is not limited to these embodiments, but various variations and modifications may be made without departing from the scope of the present invention.

INDUSTRIAL APPLICABILITY

As described above, the library apparatus of the present invention independently manages the cell address which is specified by the host computer and the cell address which is actually managed within the library apparatus. Hence, it becomes possible to store the medium which is frequently used to a position such that the moving quantity of the medium within the library apparatus becomes a minimum, and the processing efficiency of the library apparatus is greatly improved. Therefore, the present invention is extremely useful from the practical point of view.

I claim:

1. A library apparatus having an access part for moving a medium to a drive, which records/reproduces information to and from the mediums, from one of a plurality of cells, each cell having an address which is specified by a host computer the library apparatus comprising:

a cell address conversion table for storing real addresses in correspondence with each of the cell addresses;

means for regarding the cell address specified by the host computer as a virtual address and referring to the cell address conversion table to convert the virtual address into a real address which indicates the actual position of the cell within the library apparatus; and an access frequency table for storing as access frequencies the number of times the medium is moved to the drive for each of the cells, said access frequency table designating real addresses closer to the drive for frequently accessed mediums.

2. The library apparatus as claimed in claim 1, wherein said means for regarding switches the real addresses within the cell address conversion table so that the real address corresponding to the cell which has an access frequency exceeding a predetermined value in said access frequency table becomes the real address in a vicinity of said drive such that the mediums with higher access frequencies are stored in the cells closer to said drive.

3. The library apparatus as claimed in claim 2, further comprising a priority table for determining a switching of real addresses and a priority order when switching the real addresses, and said regarding means switching the real addresses based on the priority of said priority table.

4. The library apparatus as claimed in any of claims 1 to 3, wherein the address of said drive is fixed.

5. A library apparatus connected to a host computer which issues logical cell addresses to access cells which store mediums, comprising:

a plurality of storage cells storing mediums therein, each storage cell storing a medium and having a real cell address;

an interface which communicates logical cell addresses issued from the host computer to the library apparatus, each of the logical cell address specifying a logical position of one of said plurality of storage cells;

a drive which records/reproduces information to and from the mediums;

an access part for moving the mediums between said drive and said plurality of storage cells, and between cells among said plurality of storage cells;

a cell address conversion table for storing a dynamic correspondence between real cell addresses which are assigned in the library apparatus to each of said plurality of storage cells and logical cell addresses which are specified in the host computer for each of said plurality of storage cells so that the correspondence between the seal cell addresses and logical cell addresses may be changed;

means for regarding the cell address conversion table to convert logical addresses issued from the host computer into real addresses which indicate the actual position of one of said plurality of storage cells within the library apparatus; and means for controlling said access part based upon the indication of said regarding means to move the medium among said drive and said plurality of storage cells.

6. A library apparatus as claimed in claim 5, further comprising:

an access frequency table for storing as access frequencies the number of times the medium is moved to the drive for each of the cells, said access frequency table designating real addresses closer to the drive for frequently accessed mediums.

7. The library apparatus as claimed in claim 6, wherein said means for regarding switches the real addresses within the cell address conversion table so that the real address corresponding to the cell which has an access frequency exceeding a predetermined value in said access frequency table becomes the real address in a vicinity of said drive such that the mediums with higher access frequencies are stored in the cells closer to said drive.

8. The library apparatus as claimed in claim 7, wherein the address of said drive is fixed.

9. A library apparatus as claimed in claim 6, wherein:

said means for controlling moves mediums with high access frequencies closer to the drive than mediums with low access frequencies based upon address designated in said access frequency table.

10. A library apparatus connected to a host computer which issues logical cell addresses to access cells which store mediums, comprising:

a plurality of storage cells storing mediums therein, each storage cell storing a medium and having a real cell address;

an interface which communicates logical cell addresses issued from the host computer to the library apparatus, each of the logical cell addresses specifying a logical position of one of said plurality of storage cells;

a drive which records/reproduces information to and from the mediums;

an access part for moving the mediums between said drive and one of said plurality of storage cells;

a cell address conversion table for storing a dynamic correspondence between real cell addresses which are assigned in the library apparatus to each of said plurality of storage cells and logical cell addresses which are specified in the host computer for each of said plurality of storage cells so that the correspondence between the real cell addresses and logical cell addresses may be changed;

means for regarding the cell address conversion table to convert logical addresses issued from the host computer into real addresses which indicate the actual position of one of said plurality of storage cells within the library apparatus.

11. A library apparatus as claimed in claim 10, further comprising:

an access frequency table for storing as access frequencies the number of times the medium is moved to the drive for each of the cells, said access frequency table designating real addresses closer to the drive for frequently accessed mediums.

12. The library apparatus as claimed in claim 11, wherein said means for regarding switches the real addresses within the cell address conversion table so that the real address corresponding to the cell which has an access frequency exceeding a predetermined value in said access frequency table becomes the real address in a vicinity of said drive such that the mediums with higher access frequencies are stored in the cells closer to said drive.

* * * * *

UNITED STATES PATENT AND TRADEMARK OFFICE
CERTIFICATE OF CORRECTION

PATENT NO. : 5,459,848
DATED : October 17, 1995
INVENTOR(S) : Mase

It is certified that error appears in the above-indentified patent and that said Letters Patent is hereby corrected as shown below:

Column 2, line 43, delete "9 through 13" and insert --9A through 13C--.

Column 4, line 24, delete "FIG. 9 shows" and insert -- FIGS. 9A through 9C show--.

Column 4, line 40, delete "FIG. 10 shows" and insert -- FIGS. 10A through 10C show--.

Column 4, line 62, delete "FIG. 11 shows" and insert -- FIGS. 11A through 11C show--.

Column 5, line 3, delete "FIG. 12 shows" and insert -- FIGS. 12A through 12C show--.

UNITED STATES PATENT AND TRADEMARK OFFICE
CERTIFICATE OF CORRECTION

PATENT NO. : 5,459,848
DATED : October 17, 1995
INVENTOR(S) : Mase

It is certified that error appears in the above-indentified patent and that said Letters Patent is hereby corrected as shown below:

Column 4, line 16, delete "an" and insert --a--.

Column 5, line 9, delete "FIG. 13 shows" and insert --

FIGS. 13A through 13C show--.

Column 7, line 24, delete "311" and insert --$311_1$--.

Column 9, line 3, delete "of the".

Signed and Sealed this

Eighth Day of April, 1997

*Attest:*

BRUCE LEHMAN

*Attesting Officer*    *Commissioner of Patents and Trademarks*